No. 655,732. Patented Aug. 14, 1900.
A. POST & W. M. O'BRIEN.
ACETYLENE GAS GENERATOR.
(Application filed Sept. 29, 1899.)
(No Model.) 2 Sheets—Sheet 1.
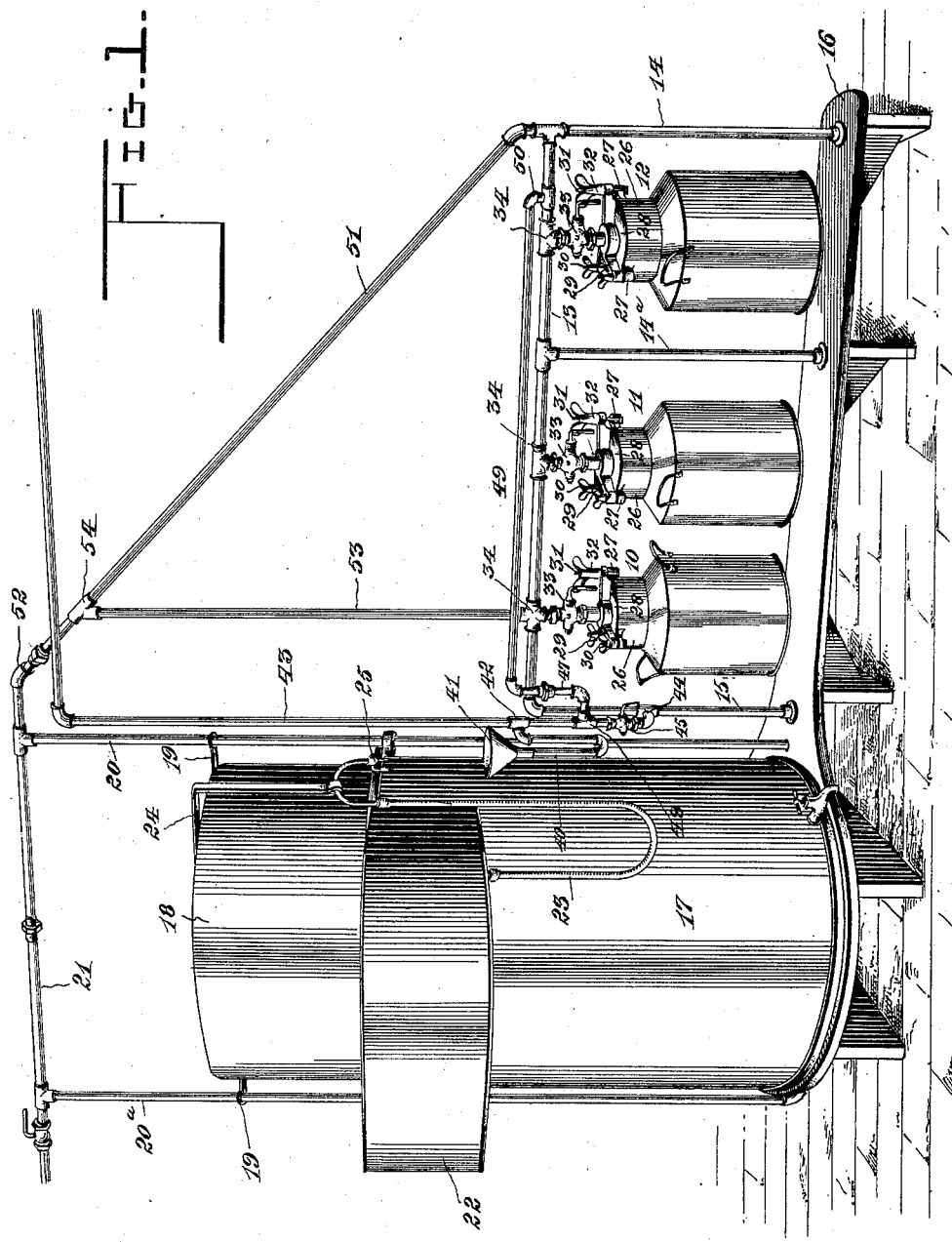
Witnesses
Amos Post,
William M. O'Brien, Inventors
By Their Attorneys, No. 655,732. Patented Aug. 14, 1900.
A. POST & W. M. O'BRIEN.
ACETYLENE GAS GENERATOR.
(Application filed Sept. 29, 1899.)
(No Model.) 2 Sheets—Sheet 2.
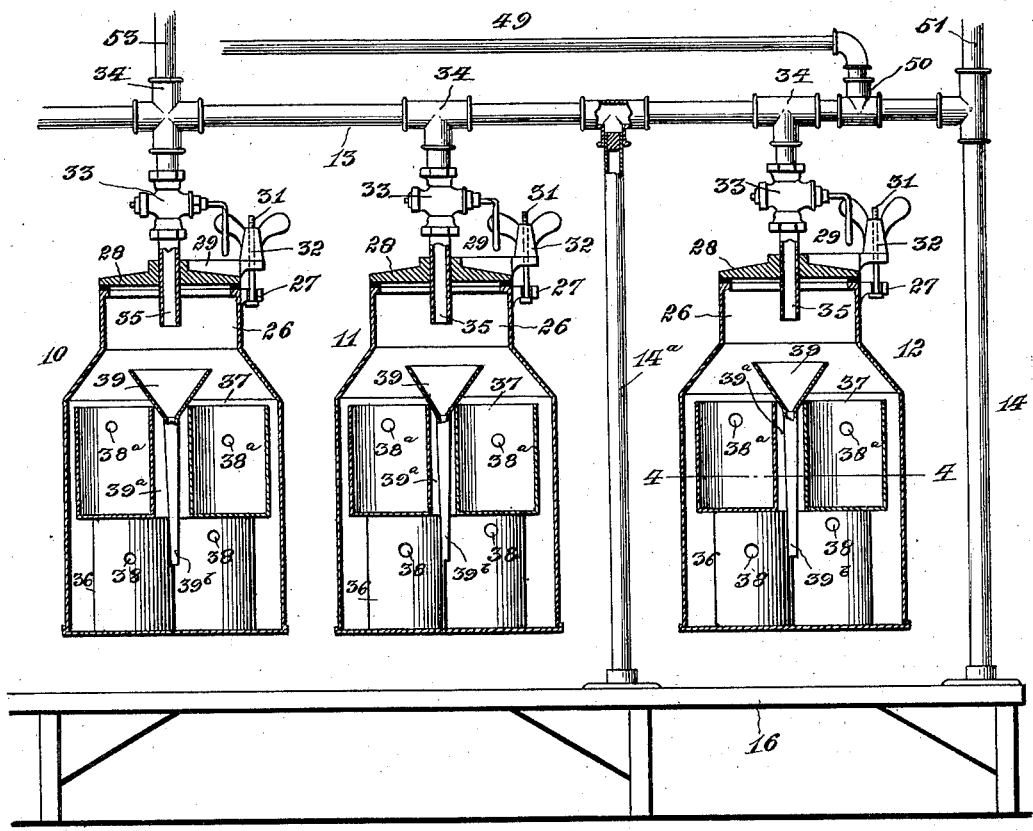
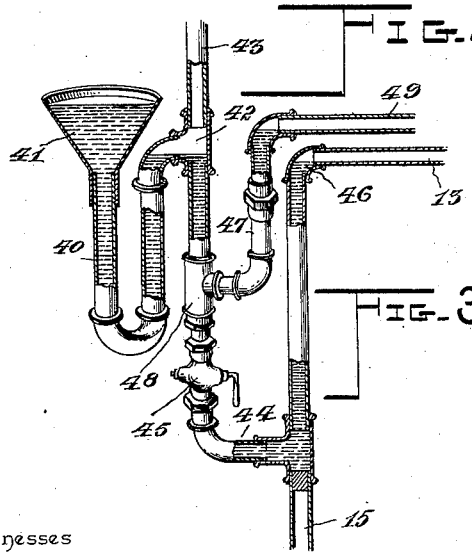
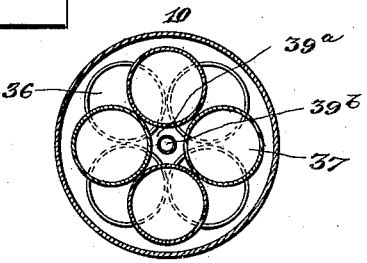
Witnesses
John F. Seufferid
W. H. Bemhard
Amos Post,
William M. O'Brien, Inventors
By their Attorneys,
C. A. Snow & Co.

UNITED STATES PATENT OFFICE.

AMOS POST AND WILLIAM M. O'BRIEN, OF CATSKILL, NEW YORK.

ACETYLENE-GAS GENERATOR.

SPECIFICATION forming part of Letters Patent No. 655,732, dated August 14, 1900.

Application filed September 29, 1899. Serial No. 732,097. (No model.)

*To all whom it may concern:*

Be it known that we, AMOS POST and WILLIAM M. O'BRIEN, citizens of the United States, residing at Catskill, in the county of Greene and State of New York, have invented a new and useful Acetylene-Gas Generator, of which the following is a specification.

Our invention relates to apparatus for generating acetylene gas, and is more particularly designed as an improvement on the apparatus disclosed by our prior Letters Patent, No. 631,476, dated August 22, 1899.

One of the improvements which we have made resides in means by which water may be supplied first in one direction and then in a reverse direction to a battery of generators and at the same time to make provision for the automatic escape of gas from the generators in the event of excessive gas-pressure therein, whereby the generators at either end of the battery may be disconnected and recharged without involving disturbance of a generator in service, and thus provide for the continued automatic production of gas.

A further improvement is an arrangement of piping by which the outflow of the gas produced in a generator may be permitted freely and without retarding the flow of water to the generator, and at the same time such pipes secure to the generator water-feed pipes a return flow of the water of condensation resulting from the condensation of aqueous vapors in the gas.

A further object is to improve the generator by isolating the carbid in separate charges adapted to be attacked successively to secure an economical consumption of the carbid and also to provide means by which the water is prevented from falling or dropping directly upon the carbid to obviate the formation of a pasty crust on the charge of active material, whereby the water is made to surround the carbid vessels to keep the latter in a cool condition and prevent the generation of a steamy vapor which is liable to condense in the pipe and affect the illuminating property of the gas.

With these ends in view the invention consists in the novel combination of devices and in the construction and arrangement of parts, which will be hereinafter fully described and claimed.

To enable others to understand the invention, we have illustrated a preferred embodiment thereof in the accompanying drawings, forming a part of this specification, and in which—

Figure 1 is a perspective view of an apparatus for generating acetylene gas embodying our improvements. Fig. 2 is a sectional elevation, on an enlarged scale, of a battery of generators, illustrating a part of the means for feeding water thereto. Fig. 3 is a perspective view, partly broken away and in section, illustrating the arrangement of parts, fragments of the main and auxiliary water-feed pipes to the generator-battery, and a fragment of the gas-pipe. Fig. 4 is a transverse horizontal sectional view, in the plane indicated by the dotted line 4 4 of Fig. 2, through one of the generators.

The same numerals of reference are used to indicate like and corresponding parts in each of the several figures of the drawings.

The individual generators of the battery are indicated by the reference-numerals 10 11 12 in the drawings, said generators being suspended for removal separately from a main water-feed pipe 13. This pipe is arranged in a horizontal position over the generator-battery, and it forms part of a supporting-stand, the latter consisting of the legs 14, 14$^a$, and 15, together with the pipe 13, previously described. The legs of this stand for the generator-battery are fastened firmly to a base or platform 16, on one end of which platform rests the tank 17 of an expansible gasometer. Within the gasometer-tank is sealed a floatable gas-bell 18, the latter having the guide-arms 19, which are fitted slidably on the parallel gas-pipes 20 20$^a$. These pipes are erected vertically at opposite sides of the expansible gasometer, so as to discharge the gas into the floatable bell and to convey the gas from the floatable bell through the bottom of the gasometer-tank in the manner fully disclosed by our patent to which reference has been made. The vertical pipes serve as guides to the gas-bell, and said pipes are connected at their upper end by a cross-pipe 21, the latter being connected to an ordinary service-pipe, which conveys the gas to the burner. The water supplied to the generator-battery is contained in a suitable tank 22, which may be supported on the gasometer-tank, and to the bottom of the water-tank is attached one end of a flexible siphon-tube 23, the free end of which is carried by a hanger-arm 24, which is movable with the floatable gas-bell, said flexible tube provided with a cock 25, adapted to be closed for shutting off the flow of water from the gasometer-controlled water-supply to the trap-feed mechanism associated with the generator-battery. The parts previously described are substantially the same as corresponding parts disclosed by our prior patent, and they are illustrated and shown herein for the purpose of enabling others to understand the application and utility of our improvements.

In accordance with our present invention we provide a novel construction of the generator, and as the generators of the battery are the same in construction a description of one will answer for each of the others. Each generator is a vessel preferably cylindrical in form, with a contracted neck 26, provided with a plurality of lugs 27. On the open upper extremity of the neck is fitted a removable cover 28, the latter having a series of arms constituting a spider 29, the ends of the spider-arms being extended or prolonged beyond the edge of the cover. A series of bolts 30 31 are passed through the lugs 27 and the ends of the spider-arms, and these bolts have the nuts 32 screwed thereon for the purpose of clamping the cover tightly upon the neck of the generator vessel, the bolt 31 being somewhat longer than the other bolts 30 in order that the wings of the nut on said long bolt may lie in the path of the handle of a stop-cock 33. The main water-feed pipe 13 is provided with a series of couplings 34, to each of which is attached the shell of the cock 33, and from this cock depends a short pipe 35, which passes through and is firmly secured to the cover 28 of the generator vessel, whereby the cover, the pipe, and the cock are attached to the main water-feed pipe, and the series of bolts serve to removably suspend the generator vessel from the cover.

Each generator vessel carries a plurality of carbid-cans 36 37, said cans adapted to contain the charge of calcium carbid which is placed within the vessel constituting part of one generator. A series of cans 36 are placed on the bottom of the generator vessel, and another series of cans 37 are stacked upon the bottom tier of cans 36, substantially in the order indicated by Figs. 2 and 4, although this special arrangement of cans is not strictly necessary. The cans in the lower tier 36 are provided with water-ports 38 at different elevations, and in like manner the cans 37 of the upper tier have water-inlet ports $38^a$ also formed therein at different elevations. The cans in the two tiers are grouped or arranged so as to leave a space between themselves, (indicated at $39^a$ in Fig. 4,) and a water-funnel 39 is arranged in this space between the cans. This funnel 39 rests upon the cans of the upper tier to be supported thereby directly in vertical alinement with the water-pipe 35, which is extended through the cover, thus making provision for the passage of the water from said pipe 35 into the funnel and preventing the water from scattering and dropping upon the charge of active material contained within the cans. The funnel has an elongated spout or tube $39^b$, which extends partly or wholly through the space $39^a$ to discharge the water admitted by the pipe 35 into the generator vessel substantially below the lowermost water-inlet port 38 in the lower tier of carbid-cans.

As in our prior patent, we employ a series of traps for use in connection with the water-pipe 13 to supply the water to the battery of generators, one of said traps being connected with an escape or gas-vent pipe to constitute an automatic blow-off in the event of excessive pressure; but we have also provided in our improved apparatus an arrangement of parts by which water may be supplied to either end of the generator-battery.

The main trap 40 is provided at its receiving end with a funnel-shaped mouth 41, arranged in the position to receive the water from the flexible tube of the gasometer-controlled supply. The short leg of this main trap is coupled at 42 with a vent-pipe 43, the latter extending outside of a building or other place of discharge. The new elements of our improvements relating to the trapped water-feed devices are the secondary trap 44, the valve 45 therein, and the auxiliary or branch water-pipe 49. These parts are arranged in a peculiar relation to the main water-pipe 13 and the safety-trap 47, as we will now proceed to describe. The receiving-leg of the safety-trap 47 is united by the coupling 42 to the delivery-leg of the main trap 40, while the delivery-leg of the safety-trap 47 is connected at one end of the auxiliary or branch water-pipe 49. The secondary trap 44 has its receiving-leg formed in part by the corresponding leg of the safety-trap, and said receiving-leg of the secondary trap 44 is provided with a valve or cock 45, the delivery-leg of the secondary trap being united by an elbow 46 to one end of the main water-pipe 13. By reference to Fig. 3 it will be understood that the length of pipe between the coupling 42 and the valve 45 constitutes the receiving-leg of the safety-trap 47 and a part of the receiving-leg of the secondary trap 44, and the safety-trap 47 has a coupling 48, which is united to the length of pipe at a point between the coupling 42 and the cock 45. It is therefore to be understood that the safety-trap 47 is connected to the near end of the auxiliary or branch pipe 49, while the secondary trap 44 is connected to the corresponding end of the main water-pipe 13. These parts are arranged to receive water from the main trap 40, the water standing in the several traps, as indicated by Fig. 3, to form the seals therein and prevent the gas from escaping from the generators through the traps. The pressure of the water in the main trap 40 is greater than the normal or excessive pressure of gas in the generators, but the pressure of water in the safety-trap 47 but slightly exceeds the maximum pressure of gas in the generators, so that an excessive gas-pressure will displace the water from the trap 47 and open a vent through said trap to the pipe 43, the latter serving to carry the gas away from the apparatus. The auxiliary trap 44 is so arranged with relation to the safety-trap that when the valve 45 is open the water will pass from the main trap through the secondary trap 44 to the pipe 13. From thence the water will flow into the generator 10 and on exhaustion of the latter into the generator 11. Subsequent to exhaustion of the carbid charge in the generator 11 it is desirable to reverse the direction of feed of water to the generator 12 in order that the generators 10 and 11 may be disconnected for the purpose of recharging the same with active material without involving disturbance in the continuity of operation of generating gas in the generator 12. This end is effected by closing the cock 45 in the secondary trap, thereby shutting off the flow of water from left to right in Figs. 1 and 2, and this operation of the valve compels the water to flow through the safety-trap 47 into the auxiliary pipe 49, the latter extending alongside of the main pipe 13 and having its outer end coupled at 50 near the corresponding end of the main pipe 13. It is evident that the water may flow from the trap 47 through the pipe 49 and into a short section of the pipe 13, from whence it flows into the generator 12. The generators 10 and 11 may be cut out of communication with the pipe 13 by closing the cocks 33, and said generators may then be removed for emptying the spent carbid from the cans therein, after which the cans should be recharged and replaced in the generator vessel and the latter again connected to the pipe 13. It will be understood that when the generator 12 becomes exhausted the water will overflow the pipe 13 into the generator 11, and on exhaustion of this generator 11 the valve 45 in the trap 44 should be opened to make the trap 44 feed the water to the left-hand section of the pipe 13 through the generator 10, whereby the generators 11 12 may be disconnected and recharged, while the generator 10 remains in service.

The gas from the generator passes into the pipe 13 and thence to either one of two pipes 51 or 53. The pipe 51 is disposed in an inclined position to the plane of the horizontal pipe 13, the same being coupled together, as shown by Fig. 1, while the upper end of the pipe 51 is coupled at 52 to the pipe 20. The other gas-pipe 53 has its lower end attached to a coupling 34 of the generator 10, but the upper end of this pipe 53 is united by a coupling 54 to the pipe 51. It is evident that the gas may escape from the generator through the pipe 13 in an opposite direction to the passage of water through said pipe, thus preventing the gas from retarding the flow of water. For example, the water may flow through the pipe 13 from the left to the generator 11, and the gas may pass from this generator toward the right, so as to flow into the pipe 51, and thence through the pipe 20 into the gasometer. On the other hand, if the water is supplied by the pipe 49 to the pipe 13, so as to flow through the latter from right to left and into the generator 11, the gas may pass from said generator toward the left through the pipe 13, and thence through the pipe 53 into the pipe 20. It is evident that the gas as it circulates through the pipes 51 or 53 will have any aqueous vapors therein condensed by impinging against the surfaces of the pipe, so that the water of condensation will return to the pipe 13.

The operation may be described, briefly, as follows: The generators having been charged with carbid, the traps having been filled with water, and water supplied to the tank 22, the elevation of the floatable bell by the accumulation of gas therein lifts the tube 23 to cut off the flow of water. On the descent of the bell the tube 23 conducts the water from the tank 22 into the trap 40, from whence the water flows through the trap 44 and the valve 45 through the pipe 35 of the generator. The water from the pipe 35 is conveyed by the funnel or conductor 39 into the generator vessel 11, so as to surround the lower tier of cans 36 therein. The water continues to flow until it overflows the lowest port 38 in one of the cans, whereupon the water attacks the carbid and the liquid and solid are decomposed for the generation of acetylene, which is free to escape into the pipe 13, thence through the pipes 51 or 53, and finally through the pipe 20 to the gasometer, thereby raising the bell to cut off the continued flow of water. On the next descent of the bell the water follows the same course, so as to overflow into the next of the series of cans, and thus the carbid in the cans of one generator is successively attacked by the increments of water until the charge in one generator is exhausted. It is to be observed that the carbid-cans in the generator are immersed in and surrounded by water, so that the cans are kept at a low temperature and the condensation of aqueous vapors in the generator is overcome.

On the exhaustion of one generator it becomes filled with water, and the water then overflows into the generator 11. The operations are repeated in this generator until the active material becomes exhausted. At this stage the valve 45 is closed, and the water flows through the trap 47 and the pipe 49 to the right-hand end of the pipe 13, thus admitting the water to the generator 12. The valves of the generators 10 11 can now be closed, the generators detached, cleansed, filled with active material, and again coupled to the pipe 13. The water may flow from the pipe 49 through the pipe 13 to the left after the generator 12 becomes exhausted, so as to overflow into the generator 11. It is evident that the valve 33 must be turned to its closed position before the nut 32 on the long bolt 31 can be manipulated to detach the generator from the pipe 13, thus preventing the water or gas from escaping before the generator is detached.

Changes may be made in the form and proportion of some of the parts while their essential features are retained and the spirit of the invention embodied. Hence we do not desire to be limited to the precise form of all the parts as shown, reserving the right to vary therefrom.

Having thus described the invention, what we claim is—

1. In an acetylene-gas apparatus, the combination with a battery of generators and a gasometer-controlled water-supply, of means between said generator-battery and a water-supply for reversing the flow of water and establishing an automatic pressure-relief for the generator-battery, said means including pipes communicating at one end, a main trap, another trap between one pipe and the main trap, and a valved trap between the other pipe and said main trap, as set forth.

2. In an acetylene-gas apparatus, the combination with a main water-pipe, and a battery of generators connected therewith, of a main trap, a secondary valved trap communicating with the main water-pipe, a branch pipe connected with the other end of the main water-pipe, and another trap between the branch pipe and the main trap, substantially as described.

3. In an acetylene-gas apparatus, the combination with a main water-pipe, a series of generators connected therewith, and a main trap, of a branch pipe connected with the main pipe near one end, a secondary trap between the other end of the main pipe and the main trap, a safety-trap connected with the branch pipe and communicating with one leg of the secondary trap, a valve in the secondary trap, and a vent-pipe, substantially as described.

4. In an acetylene-gas apparatus, the combination with a water-feed pipe, and a battery of generators, of upright gas-pipes connected with the water-pipe substantially at opposite sides of the generators, and means for reversing the flow of water through the water-pipe, substantially as described.

In testimony that we claim the foregoing as our own we have hereto affixed our signatures in the presence of two witnesses.

AMOS POST.
WILLIAM M. O'BRIEN.

Witnesses:
  ANNA M. O'BRIEN,
  ALBERT C. BLOODGOOD.